Jan. 16, 1962 K. MICHEL 3,016,801
DEVICE CONTROLLING THE LIGHT PASSING THROUGH
THE GLASS ROOF OF A CONSERVATORY
Filed Nov. 12, 1959
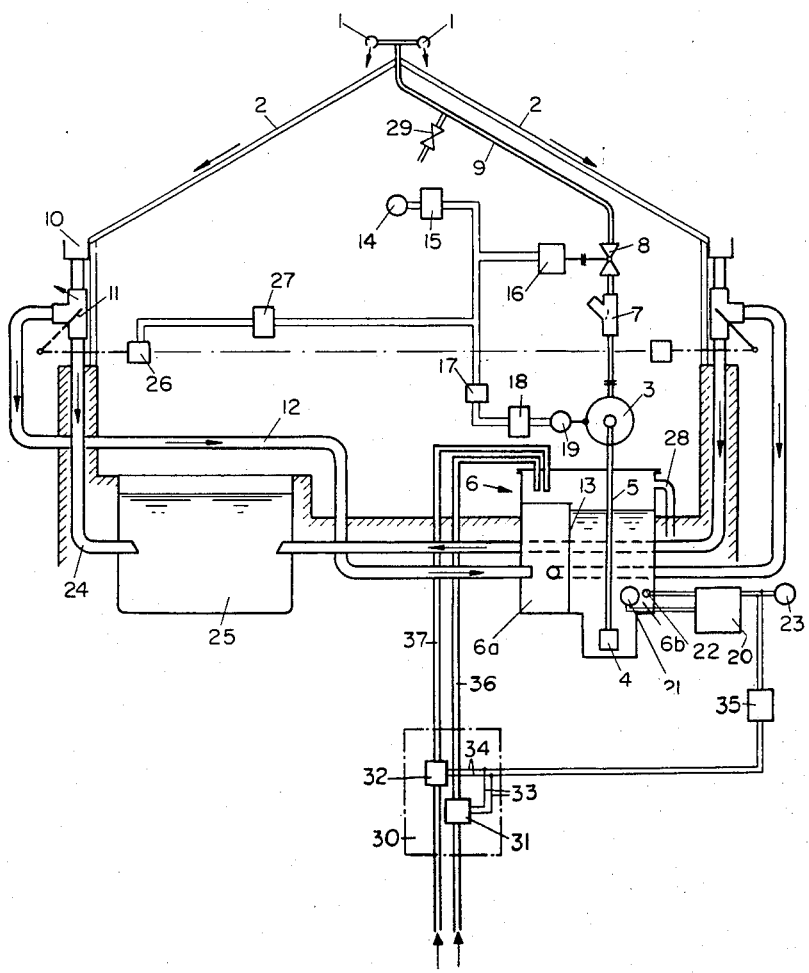

United States Patent Office 3,016,801
Patented Jan. 16, 1962

3,016,801
DEVICE CONTROLLING THE LIGHT PASSING THROUGH THE GLASS ROOF OF A CONSERVATORY
Kaspar Michel, Zug, Switzerland, assignor to Gebruder Gysi A.G., Baar, Switzerland
Filed Nov. 12, 1959, Ser. No. 852,328
3 Claims. (Cl. 88—61)

The present invention relates to the controlling of the light passing through the glass roof of a conservatory.

In order to control the brightness in the interior of a conservatory one has hitherto placed straw mats or the like upon the glass roof when there is excessive irradiation by sunlight, or one has used glass of different colors depending on the season. The application of such aids causes, however, much work, and is accordingly avoided as far as possible.

The invention has the primary object of providing a device for controlling the light passing through the glass roof of a conservatory which obviates the stated disadvantage and which still permits the current automatic or manual control of the brightness in the interior of a conservatory without any structural alterations.

With these and other objects in view, which will become apparent later from this specification and the accompanying drawings, I provide a method for controlling the amount of sunlight passing through the glass roof of a conservatory into the interior thereof, comprising the steps of spraying water upon the said glass roof near the ridge thereof, allowing the said water to flow as a light-absorbing layer over at least a part of the said glass roof, controlling the light-absorbing power of the said layer in accordance with the brightness desired within the said conservatory, and recycling the water flowing off of the said glass roof to the ridge thereof in a closed circuit. The controlling of the light-absorbing power of the layer of water may be effected by controlling the thickness of said layer. Preferably the said water is colored so as to increase the light-absorbing power thereof, which may then be controlled by controlling the intensity of the coloration of the water.

I provide also a device for the same purpose, comprising in combination: at least one spray tube arranged along the ridge of the glass roof, a gutter arranged at the lower edge of the said glass roof, piping arranged to connect said gutter to the said spray tube, and a circullation pump arranged in the said piping and in operation recycling the water from the said gutter to the said spray tube. Light-sensitive means may be arranged in the interior of the said conservatory, and a flow-control means may be arranged in said piping and operatively connected to the said light-sensitive means, in operation automatically varying the flow of water in response to said light-sensitive means to vary the brightness inside the said conservatory. Alternatively a light source and a light-sensitive means may be submerged in the water at a distance from one another, said light-sensitive means, through an amplifier and electromagnetic control means connected to the output of the latter, controlling the light-absorbing power of the water. Delayed action relays may be used in connection with either of these light-sensitive means.

In the single drawing forming a part of this specification, an embodiment of a device according to the invention is diagrammatically illustrated by way of example.

On top of the ridge of glass roof of a conservatory two spray pipes 1, each provided with one or more rows of downwardly directed fine holes, are mounted symmetrically so as to extend along the said ridge and to be as long as the said ridge itself. The glass roof has two symmetrically inclined roof planes 2, over which the water issuing from the spray tubes 1 runs in the form of a film. As shown in the drawing, the device contains many symmetrical components, of which hereinafter only those will be described which are on the left hand side of the conservatory.

The spray water is sucked by a pump 3 through a suction valve 4 and a suction pipe 5 from a sump 6, and is passed through a filter 7, a control valve 8 and a pressure pipe 9 to the two spray pipes 1. The water running off of the roof pane 1 is collected in a gutter 10 and, in the position illustrated of a switch-over flap 11, returns through a pipe 12 into the sump 6. The sump 6 is divided by a partition 13 into two compartments 6a and 6b. The pipe 12 issues into the compartment 6a, wherein dirt or like contaminations, which the water has taken in, may settle. The water then flows over the partition 13 into the compartment 6b, from which it is sucked off. Any impurities remaining in the water are then separated therefrom by the filter 7.

The water is preferably colored in order that it may better absorb the light rays when flowing over the roof panes 2 in the form of a film. By controlling, by means of the control valve 8, the amount of water flowing per second out of the spray pipes 1, the amount of light entering the conservatory through the glass roof may be regulated, in that with increasing quantity of water the thickness of the film, and accordingly its absorption of light, increase. By varying the color of the water also, the spectroscopic composition of the light entering into the conservatory may be regulated, if this is found convenient for particular cultivations.

In the present invention, an automatic control of the quantity of light is provided for. For this purpose a light-sensitive element 14, for example a photo-electric cell or a light-responsive resistor, is provided in the interior of the conservatory and is connected to an amplifier 15, the output of which is connected to a control means 16 operating the control valve 8. However, the latter may also have a handwheel, so that upon a break-down of the amplifier or upon deliberately switching off the same, it may be operated by hand. The output of the amplifier 15 is moreover connected through a delayed action relay 17 to a switch relay 18 serving for the control of a motor 19 which drives the pump 3.

With diminishing brightness in the interior of the conservatory, the control means 16 throttles the quantity of water supplied to the spray pipes 1 by means of the valve 8. When the brightness attains a certain minimum value, the motor 19 is switched off by the switching relay 18. In order that the switching relay need not respond too often for unimportant reasons, for example because of a small cloud, which passes in front of the sun, a delayed action relay 17 is provided on which a time lag and, if desired, the minimum brightness required may be adjusted. For adjusting the minimum brightness it is however preferable to provide a potentiometer or the like in the amplifier 15 by the aid of which the output voltage may be adjusted.

In order to survey the light-absorbing power of the water which is circulated, photo-electric surveying means 20 is provided which comprises a source of light 21 and a photo-electric cell 22, which are arranged under water in a sump 6 at a suitable distance from one another. The output current of the surveying means 20, which depends upon the light-absorbing power of the water, is supplied to a signalling device 23, which gives an optical and/or acoustical alarm signal upon deviation of the light-absorbing power of the water from that desired. The output of the surveying means may be connected alternatively or additionally to a dosing means which at too low or too high a light absorption power respectively, automatically allows colored liquid or clear water, respectively, to run into the sump until the desired value of the light absorption power is reestablished.

It is naturally possible to set the surveying means in operation only temporarily in order to check the liquid at predetermined time intervals, say once a day.

In the drawing an embodiment of the aforesaid dosing means is also diagrammatically illustrated by way of example. This dosing means, denoted by the numeral 30 as a whole, comprises two electromagnetically controlled valves 31 and 32, the supply leads 33 and 34, respectively, of which are electrically connected in parallel to the output of the aforesaid surveying means 20 through an amplifier 35. The valve 31 is opened when the output voltage of the amplifier 35 exceeds an upper limit upon too low a light-absorbing power of the water, while the valve 32 is opened, when this output voltage drops below a lower limit upon too high a light-absorbing power of the water. In the first case colored liquid is introduced into the sump 6 through a pipe 36, while in the second case clear water is introduced through a pipe 37. The valves 31 and 32 allow the passage per unit time of small quantities only of colored liquid and clear water, respectively, in order that good mixing of the liquid introduced with the liquid circulating may take place and that the coloring may change only quite gradually towards the design value.

In order to prevent rain water from penetrating into the described closed circuit of the "shading" water, the aforesaid switch-over flap 11 is provided. When the same is swung in the direction of the arrow, it obturates the pipe 12 and the rain water accumulating in the gutter 10 passes through a drain pipe 24 into a rain water sump 25. The rain water collecting in this sump may be used for the watering the plants in the conservatory. Of course the drain pipe 24 may issue into a sewer for the drainage.

For operation of the switch-over flap 11 an electromagnetic driving means 26 is provided, which is likewise connected to the output of the amplifier 15. Since in rain normally the brightness is very low, the valve 8 is then closed, the motor 19 is switched off and the switch-over flap 11 is turned. Between the amplifier output and the driving means 26 a delayed action relay 27 is arranged, the time lag of which exceeds that of the delayed action relay 17, so that at the moment of turning the switch-over flap there is already no water contained any more in the gutter 10. In case it should rain while at the same time the sun shines and consequently rain water is then admixed with the shading water, an overflow 28 is provided on the sump 6 which leads to the drainage sewer.

Although in the device described the shading is controlled by varying the quantity of the shading water pumped at any time by the circulation pump, one may instead regulate the color concentration thereof, which however would be possible in practice only at certain time intervals, say in accordance with the season, and consequently comes less into question. It is inherently possible to use also uncolored water for the shading. The quantity of water required then becomes, however, impractically large.

The pressure pipe 9 is connected to the water supply main through an obturator member 29. One may also spray the roof with water supplied from this main in order to attain a cooling effect with a practically negligible concomitant shading effect. The roof may be designed in known manner so that it may be slightly opened —for example adjacent to the ridge—for ventilation purposes. When hereinabove a "glass roof" is referred to, obviously the term "glass" is to be understood in its broadest meaning so as to include the usual inorganic glass as well as organic glass (transparent synthetic materials).

While I have described herein and illustrated in the accompanying drawing what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. A device for controlling the amount of sunlight passing through the glass roof of a conservatory into the interior thereof, comprising at least one spray tube extending along the ridge of the roof, a gutter extending along the lower edge of the roof, piping connecting said gutter to said spray tube, a circulating pump connected in said piping for recycling water from said gutter to said spray tube, and a flow control valve in said piping for controlling the quantity of water which is recycled, in combination with light-sensitive means positioned in the interior of the conservatory responsive to the light therein and connected to said flow control valve for automatically regulating said flow control valve in accordance with the light in the conservatory, said light-sensitive means comprising a photoelectric cell and an amplifier having an input and an output, the input of said amplifier being connected to said photoelectric cell and the output of said amplifier being operatively connected to said flow control valve.

2. A device as claimed in claim 1, comprising additionally a delayed action relay connected to the said output, and a switching relay connected to and controlled by the said delayed action relay, and an electric motor in driving connection with the said circulation pump and electrically connected to said switching relay, the said two relays automatically switching off the said motor upon the brightness in the interior of the said conservatory keeping below a predetermined value for a period exceeding the predetermined time lag of the said delayed action relay.

3. A device as claimed in claim 2, comprising additionally a second delayed action relay electrically connected to the said output and an electromagnetic drive means electrically connected to the said second delayed action relay, a three-way switch-over flap means arranged in the said piping between the said guttter and the said sump and mechanically connected to the said electromagnetic drive means, the said flap means obturating the said piping and opening a discharge port when the said electromagnetic drive means is energised by the said second delayed action relay, the time lag of the said second delayed action relay exceeding the time lag of the said first delayed action relay.

References Cited in the file of this patent
UNITED STATES PATENTS

| | | |
|---|---|---|
| 1,936,732 | Renard | Nov. 28, 1933 |
| 2,489,751 | Candler | Nov. 29, 1949 |
| 2,812,242 | Krasl et al. | Nov. 5, 1957 |